United States Patent [19]

Kimoto

[11] Patent Number: 4,485,454
[45] Date of Patent: Nov. 27, 1984

[54] ELECTRONIC DOCUMENT INFORMATION FILING SYSTEM

[75] Inventor: Katsumi Kimoto, Yokohama, Japan

[73] Assignee: Tokyo Shibaura Denki Kabushiki Kaisha, Kawasaki, Japan

[21] Appl. No.: 317,427

[22] Filed: Nov. 2, 1981

[30] Foreign Application Priority Data

Nov. 5, 1980 [JP] Japan ............................ 55-155472

[51] Int. Cl.³ ................................................ G06F 7/28
[52] U.S. Cl. ................................................ 364/900
[58] Field of Search ... 364/200 MS File, 900 MS File

[56] References Cited

U.S. PATENT DOCUMENTS

| | | | |
|---|---|---|---|
| 3,478,326 | 11/1969 | Bourghardt | 364/900 |
| 3,949,375 | 4/1976 | Ciarlo | 364/200 |
| 3,974,482 | 8/1976 | Balashov et al. | 364/900 |
| 4,104,717 | 8/1978 | Fujimura | 364/200 |
| 4,189,781 | 2/1980 | Douglas | 364/900 |
| 4,241,402 | 12/1980 | Mayper | 364/200 |

*Primary Examiner*—Raulfe B. Zache
*Assistant Examiner*—David Y. Eng
*Attorney, Agent, or Firm*—Cushman, Darby and Cushman

[57] ABSTRACT

In a document information filing system of the present invention, the document picture information and the filing information are recorded in a longitudinal video recorder (LVR). When one of the codes forming a retrieval code of the filing information is called for by a keyboard input operation, a plurality of the retrieval codes containing the called for code are selected from the LVR and then sequentially stored in a title memory. Different sequence codes are added to each of the retrieval codes by means of a sequence code addition circuit. The sequence codes and the retrieval codes are displayed in a corresponding manner by a display device. When a particular sequence code is designated by an operator, the filing information containing the retrieval code with the particular sequence code are read out from the LVR and the picture information corresponding to the filing information are displayed by the display device and/or printed.

16 Claims, 6 Drawing Figures

FIG. 6

* RETRIEVAL CONDITION
  KIND OF DOCUMENT : RESEARCH PAPER
* TECHNICAL FIELD : OPTO ELECTRONICS
  * * * *
* PERTINENT DOCUMENT(S)

| S | NO. | DIVISION | PERSON | DATE |
|---|-----|----------|--------|------|
| 1 | 003 | APPLICATION LABORATORY | T. YAMADA | APR. 15. 1959 |
| 2 | 014 | SEMICONDUCTOR DIV. | K. KIMOTO | SEP. 21. 1972 |
| ⋮ | ---- | ---- | ---- | ---- |
| 30 | 205 | ELECTRONIC COMMUNICATION DIV. | J. SMITH | AUG. 07. 1980 |

ELECTRONIC DOCUMENT INFORMATION FILING SYSTEM

BACKGROUND OF THE INVENTION

The present invention relates to a document filing system which stores electrical signals representing picture information such as documents and, when desired, retrieves desired picture information to display and/or print the same.

A filing system for recording the document information on a microfilm in a size-reduction manner has been known as a system for storing an enormous amount of the document information produced in companies and offices in a space-saving and retrieval manner. The microfilm filing system has succeeded in saving the space for keeping the document information, but has not succeeded in quickly and effectively retrieving and sampling desired information from a mass of the information.

An electronic document information filing system has been developed, superseding the microfilm filing system. The filing system two-dimensionally scans the document to be retained by laser beams, forms electrical image signals representing the scanned document contents by means of a photo multiplier, and records the image signals into a recording medium in a high recording density. In this type of filing system the filing information, corresponding to all the picture information, called "file structure" are stored. The file structure includes index information representing locations on a recording medium where the picture information are stored and further retrieval codes generally representing the picture information. When a desired retrieval code is keyed in from an input section including a keyboard, the document picture information corresponding to the file structure containing the retrieval code are retrieved and extracted, and finally are displayed on a display device. If the extracted document contents are to be printed, a corresponding key is depressed to print out the extracted document contents in hard copy form.

According to the filing system, the file structure are comprised of retrieval codes prepared by the operator and index information indicating storage addresses for document picture information. When information desired is to be extracted from the document picture information, filed in the filing system, an operator must designate a retrieval code corresponding to the desired picture information by operating the keyboard. The retrieval code is usually formed of characters and/or numerals of a number of digits. Therefore, when the retrieval code is formed of characters and/or numerals of 20 digits, the operator must operate keys on the keyboard at least 20 times for designating one piece of the picture information. The key operations are troublesome and time-consuming for the operator, adding to the work load of the operator.

SUMMARY OF THE INVENTION

Accordingly, an object of the present invention is to provide a document information filing system in which, for reading out desired document picture information, the filing information with a number of digits can be inputted by the least number of keying operations, thus alleviating the work load on an operator and thereby effectively extracting any picture information.

In a document information filing system according to the present invention, at least one piece of document picture information and at least one piece of filing information which corresponds to the picture information and which contains first and second information parts are stored in a recording means. The first information part is comprised of a plurality of codes, while the second information part represents recording locations of the picture information. When at least one of the plurality of codes in the first information part is set by an input means, the first information part of at least one containing the set code is selected from the recording means. An information processing means receives the selected first information part to temporarily add a given further code to the first information part. An indication means visually indicates the further code added to the selected first information part and a further code is added peculiarly to the first information part in a corresponding manner. When the further code is designated by the operator, the filing information containing the first information part with the designated further code is read out from the recording means, and the recording means is retrieved on the basis of the second information part of the read out administration information. As a result, the document picture information corresponding to the read out filing information is extracted.

BRIEF DESCRIPTION OF THE DRAWINGS

FIG. 6 shows a display on a cathode-ray tube which correspondingly displays sequence numbers and retrieval codes.

DETAILED DESCRIPTION OF THE PREFERRED EMBODIMENT

Figure 1:
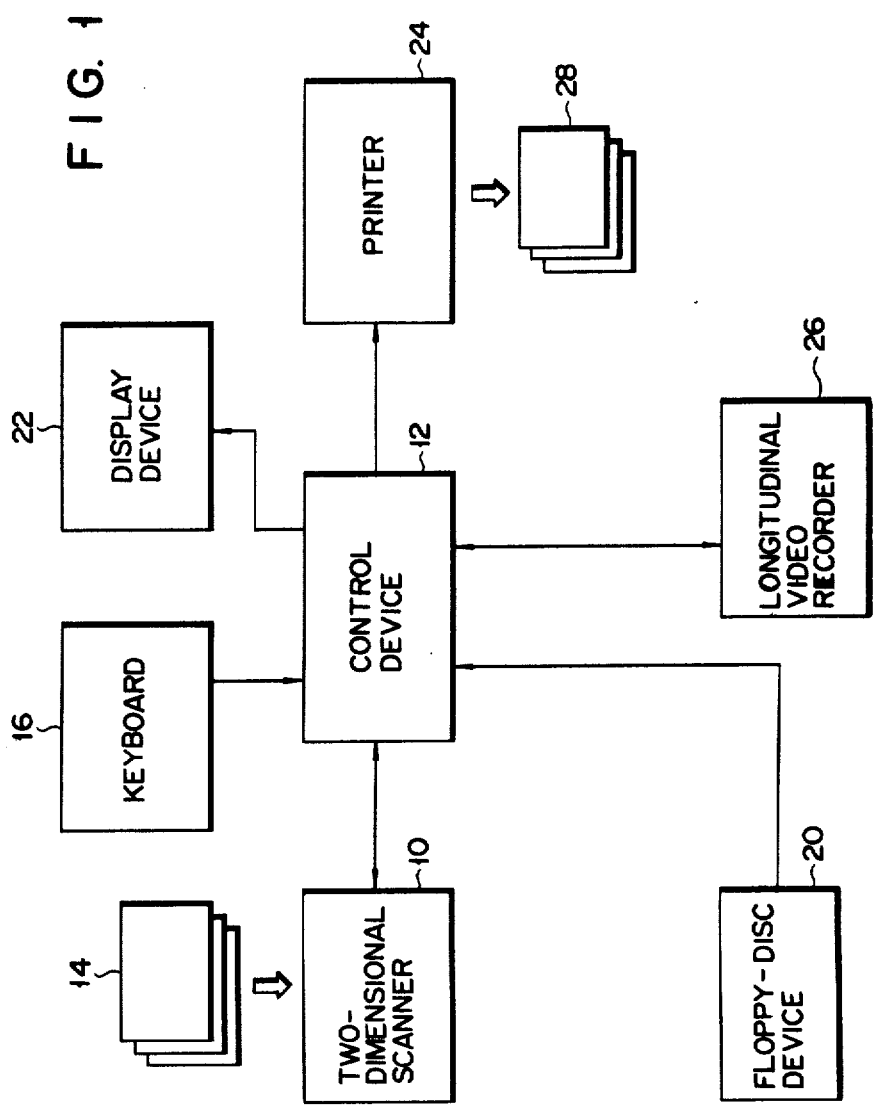
FIG. 1 shows a schematic block diagram of an overall document information filing system which is an embodiment according to the present invention.

An overall arrangement of a document information filing system which is an embodiment according to the invention is illustrated in FIG. 1. A two-dimensional scanning device 10 is connected with a control device 12. When a document 14 to be filed is set in the two-dimensional scanning device 10, the document 14 is two-dimensionally scanned by a laser beam, for example. The contents of the document 14 scanned by the laser beam is photoelectric-converted by a known photo multiplier (not shown) provided in the two-dimensional scanner 10. An image signal (picture information) corresponding to the document image is produced from the two-dimensional scanner 10 including the photo multiplier. The two-dimensional scanner 10 is provided with a switch (not shown) for adjusting the two-valued levels from the photo multiplier to the proper levels in order to make clearer a change in an optical density of the document image.

Connected to the control device 12 are an input device 16, such as a keyboard, and a floppy-disc device 20. The floppy-disc device 20 accommodates a floppy-disc (not shown) in which a given control program is previously stored. The control device 12 operates in accordance with input information transmitted from the keyboard 16 and information outputted from the floppy-disc device 20. The control device 12 controls various processing operations such as storing (filing), reproduction (retrieval and extraction), addition, insertion, delete, and the like of the picture information, such as documents, and the filing information which is so called file structure and corresponds to the picture information.

The control device 12 is connected to a display device 22, a printing device 24 and the document storage device 26. The document storage device 26, formed of a longitudinal video recorder (referred to as an LVR), includes a magnetic tape, which will be described in greater detail later, and magnetically records and retains the file structure and the picture information on the magnetic tape. The display device 22 is comprised of a known cathode-ray tube (referred to as a CRT). The display device 22 displays index codes contained in the file structure keyed in by the keyboard 16, picture information corresponding to the document 14 from the two-dimensional scanner 10, or the picture information supplied from the LVR 26. Of printing devices such as an electrostatic recording device, a thermal printer, a known ink ribbon impact printer and the like, an optical electronic copying machine is preferable for the printing device 24, in order to realize a high precision printing. The electronic copying machine can provide a picture with a resolution of 8 lines/mm and at a printing speed of 3 seconds/A4 paper size, for example, by the scanning of the laser beam. The picture information transmitted from the scanner 10 and the picture information supplied from the LVR 26 are printed on a given paper, thereby forming hard copy 28.

Figure 2:
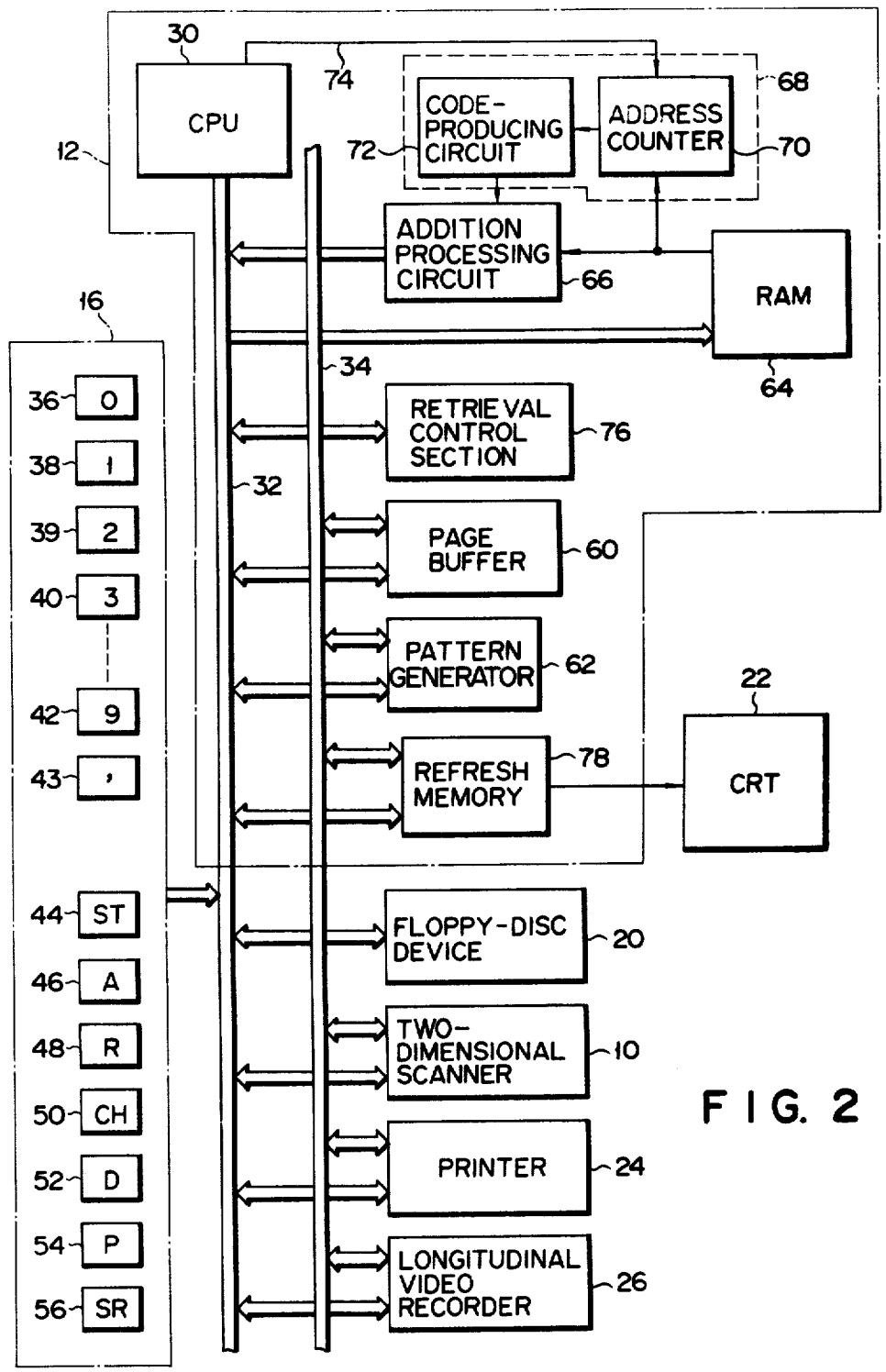
FIG. 2 shows a circuit diagram of a detailed arrangement of a document information filing system shown in FIG. 1.

FIG. 2 shows a more detailed arrangement of the document information filing system shown in FIG. 1. A central processing unit (CPU) 30 is provided in the control device 12. Provided are two buses, e.g. a data bus 32 and an image bus 34. The information transfer performed through the buses 32 and 34 is controlled by the CPU 30. The keyboard 16 and the floppy-disc device 20 are connected to the bus 32. The keyboard 16 is provided with numerical keys 36, 38, 39, 40, . . . , 42, a comma key 43, and a character key (not shown), and a plurality of function keys. A function key section includes at least seven keys. A first key 44 is a start key for starting the setting of the retrieval code or for starting the scanning of an object to be recorded such as documents by the two-dimensional scanner 10. A second key 46 is an abolition key for abolishing the picture information recorded in a page buffer 60 to be described later. A third key 48 is a record key so that the picture information recorded in the page buffer 60 can be recorded into a magnetic tape of the LVR 26. A fourth key 50 is a check key operated so that the picture information recorded on the magnetic tape has no errors. A fifth key 52 is a delete key operated so that the picture information recorded on the magnetic tape is deleted. A sixth key 54 is a print key operated when a hard copy of the picture information is desired. A seventh key 56 is a sequence read key (to be described in detail later) so that desired picture information is designated for its retrieval. The two-dimensional scanner 10, the printer 24 and the LVR 26 are connected to both the data bus 32 and the image bus 34.

The the control device 12 further comprises the page buffer 60 and a memory section 64, such as a random access memory (RAM). The page buffer 60 is comprised of a memory (not shown) connected to the data bus 32 and the image bus 34, which stores the picture information transmitted through the image bus 34 at memory locations corresponding to one page of the document. A pattern generator 62 converts a retrieval code information signal (character information signal) contained in the file structure, which is supplied through the data bus 32, into a character pattern, and transmits the pattern to the image bus 34. The memory section 64, called a title memory, temporarily stores retrieval codes contained in given file structure read out from the LVR 26. These retrieval codes are sequentially stored in the title memory 64 under addresses. The output terminal of the memory 64 is connected to an addition processing circuit 66. The output terminal of the memory 64 is also connected to a sequence code generator 68 for generating further codes (called sequence codes formed by positive integers, for example) corresponding to the memory addresses for the retrieval codes stored in the memory 64. The sequence code generator 68 is provided with an address counter 70 for counting up the number of retrieval codes read out from the memory 64 in the order from the lower numbered memory addresses to produce count signals. The output from the counter 70 is supplied to a code-producing circuit 72 provided also in the code generator 68. The code-producing circuit 72 responds to the count signal from the counter 70 to form the sequence codes for the retrieval codes sequentially read out from the title memory 64. The output terminal of the code-producing circuit 72 is connected to the addition processing circuit 66. Accordingly, in the addition processing circuit 66, different sequence codes are independently added to the retrieval codes read out form the title memory 64. The retrieval codes added to the sequence codes are supplied to the pattern generator 62 through the data bus 32. The CPU 30 supplies a reset signal 74 to the counter 70 and when receiving the reset signal 74, the counter 70 is reset to return to an initial value, or zero.

The control device 12 is further provided with a retrieval control section 76 and a refresh memory 78 with a memory capacity corresponding to a screen area of the monitor CRT 22. The retrieval control section 76 is connected to the data bus 32. When a given sequence code is selected through the operation of the keyboard 16, the retrieval control section 76 selects a single retrieval code with the sequence code from the memory 64. The retrieval control section 76 administrates the sequence codes and the retrieval codes corresponding to the sequence code in one-to-one correspondence manner.

The refresh memory 78 is connected to the data bus 32 and the image bus 34. The output terminal of the refresh memory 78 is connected to the monitor CRT 22.

Figure 3:
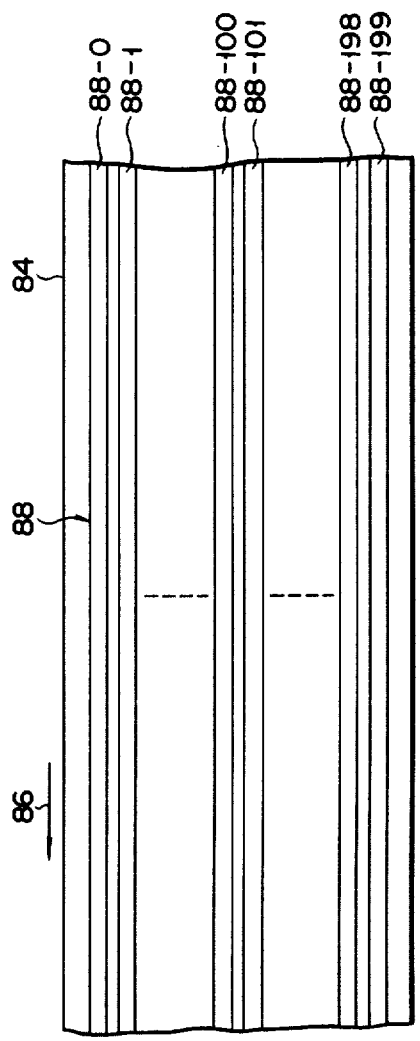
FIG. 3 is a schematic diagram of an arrangement of recording tracks formed on a magnetic tape of the document storage device shown in FIGS. 1 and 2.

An endless magnetic tape unit (not shown) is removably loaded into the document storage device 26 formed of the LVR shown in FIGS. 1 and 2. A number (e.g. 200) of parallel lines arranged normal to a running direction as indicated by an arrow 86, are formed on the magnetic tape 84 of the magnetic tape unit, as shown in FIG. 3. The recording tracks 88 are numbered 0, 1, 2, . . . , 198, 199 in succession from the uppermost track, for example. To be more specific, a track number "0" is applied to the uppermost recording track 88-0, and a track number "199" is applied to the lowermost track 88-199. The filing information (called file structure) determined by the respective picture information are recorded on the two recording tracks 88-100 and 88-101 located at the substantially central portion of the tape 84. In this case, one of the tracks, for example, the track 88-101, is used as a spare track into which the same track information as the contents recorded on the track 88-100 are recorded shifted at given intervals. The recording track 88 is divided into segmental areas (not shown) of 256, for example, serially in the tape running direction 86 of the magnetic tape 84. These areas are called sectors to which given sector numbers are attached in succession. Of those sectors, the 4th to 252nd sectors are used as effective sectors.

The arrangement of the filing information (called file structure) as mentioned above will be described in detail. The file structure is comprised of four kinds of partial information, for example. The document filing system is applicable for the custody and retrieval of various information media containing the information regarding real estate, libraries and the like. Accordingly, the file structure may properly be set in accordance with the kinds of the information media to which the filing system is applied.

Figure 4:
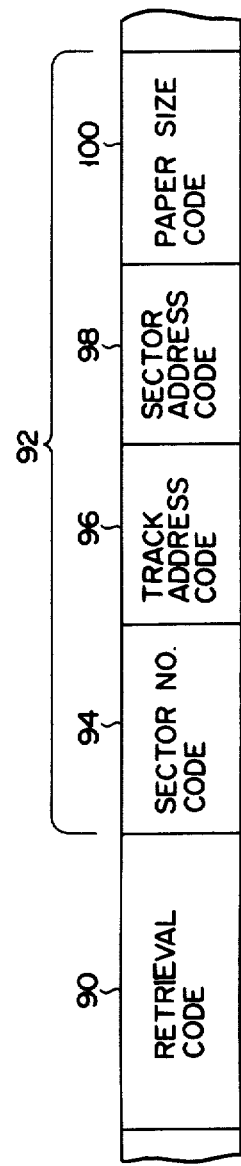
FIG. 4 is a schematic diagram of a model of the file structure applied for a document information filing system as an embodiment according to the present invention.

Turning now to FIG. 4, there is shown a model of the filing information (called file structure) applied for the custody and retrieval of the documents produced in the offices. The file structure is recorded on the recording tracks 88-100 and 88-101 of the magnetic tape 84 shown in FIG. 3. The file structure has 25 digits, for example, and is comprised of a retrieval code 90 of 20 digits, consisting of six parts maximum, and the index information 92 of five digits. The index information 92 will first be decribed. The index information 92 comprises of four parts. A first part 94 has one digit and is a sector number code representing a length of the picture information or the number of the sectors. Second and third parts 96, 98 are a track address code, representing a track number of the recording track for recording the picture information, and a sector address code, representing a sector number, respectively. The track address code 96 has two digits, and the sector address code 98 has one digit, for example. A fourth part 100 is a document paper size code set by the key-in operation by an operator or a document size as detected by the two-dimensional scanner 10.

Figure 5:
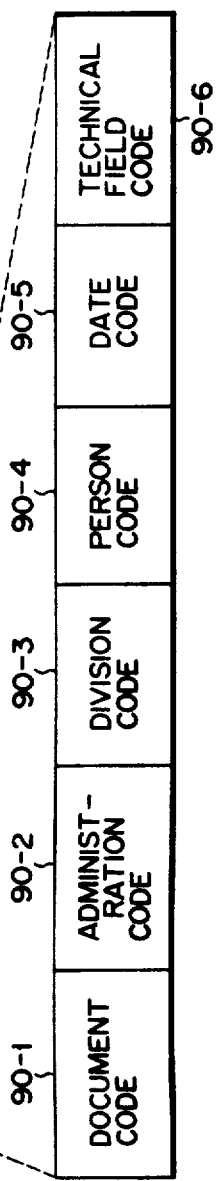
FIG. 5 is a schematic diagram of a model of retrieval code contained in the file structure shown in FIG. 4.

FIG. 5 shows in detail the arrangement of the retrieval code 90 in the file structure shown in FIG. 4. The arrangement shown is a mere example and does not limit the present invention in any way. It is evident, therefore, that it may be changed or modified conforming to the conditions in which it is used. For filing documents produced in offices, such as technical documents produced in a company having a plurality of technical developing divisions, the retrieval code contained in the file structure is made up of six subcodes, for example, as shown in FIG. 5. A first subcode 90-1 is a document code. Contained in the documents to be filed are research papers, experiment reports, search reports, drafts, production technology reports, and the like. Codes of two or three digits are prepared for these documents, respectively, and a code corresponding to the kind of the document to be filed is recorded as the first subcode 90-1 onto the recording track 86A. An administration number attached to the document is used as a second subcode 90-2. A third subcode 90-3 is a division code for indicating a division to which the document to be filed belongs. A fourth subcode 90-4 is a person code for indicating a research worker who prepared the document to be filed. A fifth subcode 90-5 is a date code indicating the date of the issuance of the document to be recorded. A sixth subcode 90-6 is a technical field code indicating the technical field to which the document in question belongs.

The operation of the document information filing system thus constructed, which is an embodiment according to the present invention, will be described below. The operation of the system includes a record (filing) mode and a reproduction (retrieval) mode.

A first case in which a desired document is filed in the filing system will now be described. A document 14 (FIG. 1) to be filed is set in the two-dimensional scanner 10, and a given magnetic tape unit (not shown) is loaded into the LVR 26. Corresponding to the document, a retrieval code including six subcodes and contained in the file structure is prepared by an operator operating the keyboard 16. When the start key 44 on the keyboard 16 is depressed, the CPU 30 in the control device 12 checks the correctness of the retrieval code, keyed in by the operator, on the basis of a format for preparing the retrieval code which has been previously defined. The CPU 30 also checks that the retrieval code inputted conforms to the format data stored in the floppy-disc device 20. The CPU 30 further inspects that the retrieval code inputted by the operator is not coincident with any retrieval code of the previously filed retrieval codes, in order to prevent or inhibit a double file. After the inspection by the CPU 30, if the retrieval code inputted is incorrect, the operator is informed in a known manner. At this time, the operator again operates the keyboard 16 to correctly input correct retrieval code.

After the completion of the inputting of the retrieval code, the two-dimensional scanner 10 operates to read out the picture information of the document and to transfer it to the page buffer 60. When the picture information of one unit, or one page of the document 14, is stored in the page buffer 60, the picture information is supplied to the LVR 26 under control of the CPU 30. In the LVR 26, the picture information is recorded on the recording tracks 88 of the magnetic tape 84 (except the recording tracks 88-100 and 88-101 since the filing information (called file structure) are stored therein). The picture information is recorded and arranged following the other picture information already stored in the recording tracks. At this time, the CPU 30 judges the track addresses, the sector addresses and the like of the picture information and forms the index information 92. The index information is added to the retrieval code inputted by the operator, to complete the formation of the file structure. The file structure is recorded on the recording tracks 88-100 and 88-101 of the magnetic tape of the LVR 26.

The retrieval of desired information from those pieces of the document picture information recorded as mentioned above will now be described. The magnetic tape unit (not shown) having the picture information recorded is loaded into the LVR 26.

As is often the case, the actual document desired is unknown, but a document able to satisfy a given condition is searched for randomly. For example, when a research paper relating to a specific technical field of opto-electronics is desired, only the document code and the technical field code of those subcodes constituting the retrieval code are inputted into the present filing system. At this time, the file structure containing the two codes are read out from the magnetic tape 84 of the LVR 26. The retrieval codes (referred to as "selected retrieval codes") contained in the file structure are selected in the following way. If the retrieval codes are 30 in number, for example, then those 30 codes are sequentially stored in the order of the addresses of the memory, in accordance with the order of the reading out of the file structure. Accordingly, different memory addresses are applied to each of the selected 30 retrieval codes in the title memory 64. At this time, a counter 70 contained in the code generator 68 detects one by one the retrieval codes sequentially transmitted from the memory 64 and supplies a count signal to the code-producing circuit 72. The code-producing circuit 72 forms further codes (referred to as sequence codes) corresponding to the memory addresses in the memory 64 and supplies it to the addition processing circuit 66. The sequence codes are numerals, characters, and the like, and positive integers (sequence numbers) in the present embodiment. The addition processing circuit 66 adds the sequence numbers to the retrieval codes transmitted from the memory 64 in succession. The retrieval codes with the sequence numbers added thereto are converted into the character pattern by the pattern generator 62 and stored in the page buffer 60, and then are displayed by the monitor CRT 22, as shown in FIG. 6. Alternatively, the retrieval codes with the sequence numbers added thereto are produced in hard copy form from the printer 24. Usually, when the size of the recording paper is A4, 50 retrieval codes per paper can be recorded on the paper. Incidentally, if an edition mode is previously designated by the keyboard 16 for alphabetical order, alternatively, the sequence numbers are added to the retrieval codes in alphabetical order, and then are displayed and/or printed.

Seeing the display screen of the CRT 22 shown in FIG. 6, an operator desires a research paper by K. KIMOTO in a semiconductor division, for example. In this case, the sequence number added to the retrieval code attached to the paper is "2". Accordingly, the operator depresses a "2" numerical key 39 and then a given sequence read key 56. Upon operating those keys, the retrieval control section 76 starts to operate. The retrieval control section 76 selects a retrieval code corresponding to the sequence number "2" from the title memory 64 under control of the CPU 30. According to the retrieval code, the CPU 30 extracts the file structure containing the retrieval codes from the LVR 26. On the basis of the specified index information contained in the extracted file structure, the document picture information corresponding to the specified index information is reproduced from the LVR 26. The picture information reproduced is stored in the page buffer 60 and is displayed on the CRT 22. At this time, the print key 54 provided on the keyboard 16 is pushed, and the picture information is supplied to the printer 24 which then produces a hard copy of the picture information. In other words, the operator can display and/or print a desired document by merely designating the sequence number S added to the retrieval code of the desired retrieval document.

When the operator wants to get all the documents with the sequence numbers "2" to "30", after seeing the display screen shown in FIG. 6, he sequentially depresses a "2" command key 29, a comma key 43, a "3" numerical key 40, a "0" numerical key 36 and a sequence read key 56 in this order. The above-described sequential keying operations indicate that it is desired to reproduce a batch of the documents with the sequence numbers "2" to "30" from the LVR 26. In this case, the retrieval codes corresponding to the sequence numbers "2" to "30" are selected from the title memory 64 by the retrieval control section 76 and finally the desired documents are displayed and/or printed through similar procedural operations.

In the document information filing system of the present invention, when reading out the desired picture information, the information are displayed with the retrieval codes each having the sequence codes attached thereto. The retrieval codes displayed have each a plurality of subcodes. Seeing the retrieval codes displayed and finding a desired document from those codes, the operator can display and/or print the desired document by merely designating a sequence code attached to the retrieval code corresponding to the document. Note here that there is no need for correctly keying all the subcodes corresponding to the desired document and hence the keyboard operation can be simplified. Thus, the number of the keying operations of the input device is reduced, so that a probability of erroneous keying operations can be also reduced. The filing system of the present invention is free from wasteful work in that the likelihood of undesired picture information being read out due to erroneous key operation is reduced, for example, thereby preventing wasted read out time. In this regard, it is believed that the filing system of the present invention greatly contributes to improved working efficiency in companies and offices.

Although the present invention has been shown and described with respect to a particular embodiment, nevertheless, various changes and modifications which are obvious to a person skilled in the art to which the present invention pertains are deemed to lie within the spirit, scope and contemplation of the invention.

What is claimed is:

1. A document information filing system for filing and retrieving a plurality of documents, said system comprising:

recording means for recording plural pieces of document picture information for each one of said plurality of documents and plural pieces of file structure data, which correspond to said plural pieces of document picture information, each of said plural pieces of file structure data comprising first and second data units, said first data unit including a plurality of first codes, which are set by an operator to identify one of said plurality of documents when said one document is registered in said document information filing system, and said second data unit including a plurality of second codes indicative of a recording location of said plural pieces of document picture information in said record means;

input means for inputting at least one arbitrary code of said plurality of first codes for retrieving one of said plurality of documents;

first retrieval means, connected to said recording means and input means, for selecting all of those first data units which include said at least one arbitrary first code, input by said input means;

indication means, connected to said first retrieval means, for receiving said selected first data units and visually indicating, in a one-to-one relation, each one of said selected first data units together with one of said plurality of second codes; and second retrieval means, connected to said recording means and input means, for reading out from said recording means, when at least one of said plurality of second codes is designated, that piece of said file structure data which includes said first data unit corresponding to said designated second code, and for retrieving from said recording means, based on said second data unit included in said read-out file structure data, that document picture information which corresponds to said read-out file structure data.

2. A document information filing system according to claim 1, further comprising information processing means, connected to said first retrieval means, for receiving said selected first data units and preparing said second codes corresponding to said selected first data units in one-to-one relation, and for temporarily attaching one of said second codes to the corresponding first data unit.

3. A document information filing system according to claim 2, wherein said information processing means comprises:
   memory means, connected to said recording means, for temporarily storing said selected first data units at predetermined memory addresses; and
   code generator means, connected to said memory means, for generating said second codes according to said memory addresses of said selected first data units.

4. A document information filing system according to claim 3, wherein said information processing means further comprises means for sequentially adding said second codes to said first data units read out from said memory means, said code being used for a retrieval operation of said second retrieval means.

5. A document information filing system according to claim 3, wherein said code generator means comprises:
   address counter means, connected to said memory means, for counting up said selected first data units, which are read out from the lowest address to the largest address, to generate a count signal; and
   code-producing circuit means, connected to said address counter, for generating said second codes which represent positive integers that sequentially increase, for each of said first data units sequentially read out from said memory means.

6. A document information filing system according to claim 5, wherein when a plurality of arbitrary first codes are specified by said input means, said first retrieval means retrieves from said recording means at least one of said first data units, which includes the same codes as said specified arbitrary first codes.

7. A document information filing system according to claim 6, wherein when a plurality of said second codes are serially designated, said second retrieval means reads out those pieces of said file structure data which include first data units corresponding to said designated second codes, and retrieves from said recording means, based on the second data units included in said read-out file structure data, those pieces of document picture information which correspond to said read-out file structure data.

8. A document information filing system according to claim 7, wherein said memory means includes a random access memory.

9. A document information filing system according to claim 8, wherein said indication means includes a display device with a screen, and at least one piece of said selected first information part and at least one piece of said further code added to said first information part are displayed on the screen of said display device in a corresponding manner.

10. A document information filing system according to claim 9, wherein said display device includes a cathode-ray tube.

11. A document information filing system according to claim 5, wherein when a plurality of arbitrary first codes are specified by said input means, said first retrieval means retrieves from said recording means a plurality of said first data units, which include the same codes as said specified arbitrary first codes.

12. A document information filing system according to claim 11, wherein said second retrieval means includes:
   control means for receiving, when said second code is designated by said input means, said second code to extract from said memory means one of said plurality of first data units with said second code attached thereto.

13. A document information filing system according to claim 12, wherein each of said first data units is prepared by an operator at a document register mode and includes:
   a document code which is attached to any one of said documents to be registered and represents the type of said to be registered document;
   a division code indicating to which division in a company said to be registered document belongs;
   a person code representing the author of said to be registered document; and
   a document code representing the date on which said to be registered document is prepared.

14. A document information filing system according to claim 1, wherein said indication means includes a printing device, and at least one piece of said selected first information part and at least one piece of said further code corresponding to said first information part are printed on a given sheet in a corresponding manner.

15. A document information filing system according to claim 14, wherein said input means includes a keyboard.

16. A document information filing system comprising:
   recording means for recording plural pieces of document picture information and plural pieces of filing information, which correspond to said document picture information, each of said plural pieces of filing information comprising first and second information parts, said first information part including a plurality of first codes which are prepared so as to identify a document when said document is registered in said document information filing system, and said second information part including a plurality of second codes indicative of a recording location of said document picture information in said recording means;
   input means for inputting at least one arbitrary first code of said plurality of first codes during a document retrieving operation;
   first retrieval means for selecting those first information parts which include said at least one arbitrary first code input by said input means;

information processing means for receiving said selected first information parts and temporarily attaching one of said plurality of second codes, in a one-to-one relation, to said selected first information parts;

indication means for visually indicating said selected first information parts with said attached second codes, in a one-to-one relation; and second retrieval means for reading out from said recording means, when at least one of said plurality of second codes is designated, that piece of said filing information which includes a first information part corresponding to said designated second code, and for retrieving from said recording means, based on said second information part included in said read-out filing information, that document picture information which corresponds to said read-out filing information.

* * * * *